(12) United States Patent
Peoples et al.

(10) Patent No.: US 8,463,808 B2
(45) Date of Patent: Jun. 11, 2013

(54) EXPANDING CONCEPT TYPES IN CONCEPTUAL GRAPHS

(75) Inventors: Bruce E. Peoples, State College, PA (US); Michael R. Johnson, State College, PA (US); Jonathon P. Smith, Port Matilda, PA (US)

(73) Assignee: Raytheon Company, Waltham, MA (US)

( * ) Notice: Subject to any disclaimer, the term of this patent is extended or adjusted under 35 U.S.C. 154(b) by 427 days.

(21) Appl. No.: 12/266,671

(22) Filed: Nov. 7, 2008

(65) Prior Publication Data

US 2010/0287179 A1 Nov. 11, 2010

(51) Int. Cl.
*G06F 17/30* (2006.01)

(52) U.S. Cl.
USPC .......................................... 707/769; 707/794

(58) Field of Classification Search
USPC .............. 707/706, 736, 999.003, 999.01, 769
See application file for complete search history.

(56) References Cited

U.S. PATENT DOCUMENTS

| | | | |
|---|---|---|---|
| 4,964,063 A | 10/1990 | Esch | |
| 6,169,986 B1 | 1/2001 | Bowman et al. | |
| 6,263,335 B1* | 7/2001 | Paik et al. | 707/999.005 |
| 6,523,028 B1 | 2/2003 | DiDomizio et al. | |
| 6,847,979 B2* | 1/2005 | Allemang et al. | 707/797 |
| 7,031,909 B2 | 4/2006 | Mao et al. | |
| 7,139,755 B2 | 11/2006 | Hammond | |
| 7,225,183 B2 | 5/2007 | Gardner | |
| 7,428,529 B2 | 9/2008 | Zeng et al. | |
| 7,539,619 B1 | 5/2009 | Seligman et al. | |
| 7,555,472 B2 | 6/2009 | Craig et al. | |
| 7,685,118 B2 | 3/2010 | Zhang | |
| 7,761,298 B1 | 7/2010 | Pereira et al. | |
| 7,853,555 B2 | 12/2010 | Peoples et al. | |
| 7,882,143 B2 | 2/2011 | Smyros et al. | |
| 7,991,608 B2 | 8/2011 | Johnson et al. | |
| 2002/0002454 A1 | 1/2002 | Bangalore et al. | |
| 2002/0022955 A1 | 2/2002 | Troyanova et al. | |
| 2002/0022956 A1 | 2/2002 | Ukrainczyk et al. | |
| 2002/0107844 A1 | 8/2002 | Cha et al. | |
| 2002/0111941 A1 | 8/2002 | Roux et al. | |
| 2003/0028367 A1 | 2/2003 | Chalabi | |
| 2003/0049592 A1 | 3/2003 | Park | |

(Continued)

OTHER PUBLICATIONS

U.S. Appl. No. 61/064,915 and drawings, Inventor: Ber Ofer and Ber Ran, filed Apr. 3, 2008.*

(Continued)

*Primary Examiner* — Wilson Lee
*Assistant Examiner* — Thuy Bui
(74) *Attorney, Agent, or Firm* — Daly, Crowley, Mofford & Durkee, LLP

(57) ABSTRACT

In one embodiment, searching documents includes generating a query conceptual graph for a search query. The query conceptual graph has graph terms representing concept types. A set of conceptually similar terms is identified for each graph term, and the set is mapped to the concept type represented by the graph term. Documents are searched in accordance with the set of conceptually similar terms. In another embodiment, selecting a document includes determining documents that satisfy a search query expressed as a query conceptual graph. A document conceptual graph that has graph terms representing concept types is generated for each document. A set of conceptually similar terms is identified for each graph term, where the set is mapped to the concept type represented by the graph term. A document is selected if terms of the sets associated with the document match terms associated with the query conceptual graph.

20 Claims, 3 Drawing Sheets

U.S. PATENT DOCUMENTS

| | | | |
|---|---|---|---|
| 2003/0050915 | A1* | 3/2003 | Allemang et al. ............... 707/1 |
| 2003/0177000 | A1 | 9/2003 | Mao et al. |
| 2003/0229497 | A1 | 12/2003 | Wilson et al. |
| 2004/0024739 | A1* | 2/2004 | Copperman et al. ............. 707/1 |
| 2004/0067471 | A1 | 4/2004 | Bennett |
| 2004/0093328 | A1 | 5/2004 | Damle |
| 2004/0107088 | A1 | 6/2004 | Budzinski |
| 2004/0236729 | A1 | 11/2004 | Dingledine et al. |
| 2005/0278325 | A1* | 12/2005 | Mihalcea et al. ................ 707/6 |
| 2006/0074832 | A1 | 4/2006 | Gardner et al. |
| 2006/0184516 | A1* | 8/2006 | Ellis ................................ 707/3 |
| 2006/0235843 | A1 | 10/2006 | Musgrove et al. |
| 2007/0005343 | A1 | 1/2007 | Sandor et al. |
| 2007/0136251 | A1 | 6/2007 | Colledge et al. |
| 2007/0250493 | A1 | 10/2007 | Peoples et al. .................. 707/4 |
| 2007/0294223 | A1 | 12/2007 | Gabrilovich et al. |
| 2008/0033932 | A1* | 2/2008 | DeLong et al. .................. 707/5 |
| 2008/0270120 | A1 | 10/2008 | Pestian et al. |
| 2008/0270138 | A1 | 10/2008 | Knight et al. |
| 2009/0012928 | A1 | 1/2009 | Lussier et al. |
| 2009/0063473 | A1 | 3/2009 | Van Den Berg et al. |
| 2009/0089047 | A1 | 4/2009 | Pell et al. |
| 2009/0171876 | A1* | 7/2009 | Tirri ............................... 706/46 |
| 2009/0259459 | A1* | 10/2009 | Ceusters et al. ................ 704/9 |
| 2010/0070449 | A1* | 3/2010 | Arnold et al. .................. 706/48 |
| 2010/0115003 | A1* | 5/2010 | Soules et al. .................. 707/822 |
| 2010/0121884 | A1 | 5/2010 | Peoples et al. |
| 2010/0153368 | A1 | 6/2010 | Peoples et al. |
| 2010/0153369 | A1 | 6/2010 | Peoples et al. |
| 2010/0161669 | A1 | 6/2010 | Peoples et al. |
| 2010/0223276 | A1* | 9/2010 | Al-Shameri et al. .......... 707/769 |
| 2011/0040774 | A1 | 2/2011 | Peoples et al. |

OTHER PUBLICATIONS

USPTO, Office Action dated Mar. 15, 2011 for U.S. Appl. No. 12/266,724, filed Nov. 7, 2008 in the name of Bruce E. Peoples, 12 pages.

Patent Application entitled, "Applying Formal Concept Analysis to Validate Expanded Concept Types", 24 pages specification, claims and abstract, 5 pages of drawings, inventors Bruce E. Peoples et al., filed Nov. 7, 2008.

Request for Continued Examination and Response to Final Office Action filed on Apr. 3, 2012; for Final Office Action dated Jan. 26, 2012; for U.S. Appl. No. 12/342,580; 10 pages.

Office Action dated Apr. 26, 2012; for U.S. Appl. No. 12/335,260; 17 pages.

Final Office Action dated Apr. 23, 2012; for U.S. Appl. No. 12/541,244; 29 pages.

Rodriguez et al.; "Determining Semantic Similarity among Entity Classes from Different Ontologies;" IEEE Transactions on Knowledge and Data Engineering, vol. 15, No. 2; Mar./Apr. 2003; pp. 442-456.

Response filed Jun. 10, 2011; to Office Action dated Mar. 15, 2011; for U.S. Appl. No. 12/266,724; 9 pages.

Final Office Action dated Sep. 1, 2011 for U.S. Appl. No. 12/266,724; 9 pages.

RCE with Response filed Nov. 30, 2011; for Office Action dated Sep. 1, 2011; for U.S. Appl. No. 12/266,724; 15 pages.

Office Action dated Jan. 9, 2012; for U.S. Appl. No. 12/266,724; 21 pages.

Response filed Mar. 15; to Office Action dated Jan. 9, 2012; for U.S. Appl. No. 12/266,724; 9 pages.

Office Action dated Aug. 5, 2011; for U.S. Appl. No. 12/342,580; 11 pages.

Response filed Nov. 7, 2011; to Office Action dated Aug. 5, 2011; for U.S. Appl. No. 12/342,580; 11 pages.

Final Office Action dated Jan. 26, 2012; for U.S. Appl. No. 12/342,580; 17 pages.

Office Action dated Aug. 2, 2011; for U.S. Appl. No. 12/335,260; 12 pages.

Response filed Nov. 2, 2011; for Office Action dated Aug. 2, 2011; for U.S. Appl. No. 12/335,260; 12 pages.

Office Action dated Jan. 20, 2012; for U.S. Appl. No. 12/335,260; 12 pages.

Response filed Mar. 22, 2012; for Office Action dated Jan. 20, 2012; for U.S. Appl. No. 12/335,260; 14 pages.

Office Action dated Mar. 29, 2011 for U.S. Appl. No. 12/355,283; 13 pages.

Response filed Jul. 29, 2011; for Office Action dated Mar. 29, 2011 for U.S. Appl. No. 12/355,283; 12 pages.

Final Office Action dated Oct. 31, 2011; for U.S. Appl. No. 12/335,283; 14 pages.

Response filed Nov. 30, 2011; to Office Action dated Oct. 31, 2011; for U.S. Appl. No. 12/335,283; 17 pages.

Advisory Action dated Dec. 9, 2011; for U.S. Appl. No. 12/355,283; 13 pages.

RCE with Response to Advisory Action filed on Feb. 16, 2012; for Advisory Action dated Dec. 9, 2011; for U.S. Appl. No. 12/355,283; 24 pages.

Office Action dated May 26, 2011; for U.S. Appl. No. 12/541,244; 24 pages.

Response filed Aug. 25, 2011; to Office Action dated May 26, 2011; for U.S. Appl. No. 12/541,244; 14 pages.

Final Office Action dated Sep. 21, 2011; for U.S. Appl. No. 12/541,244; 24 pages.

RCE and Response filed Nov. 30, 2011; to Final Office Action dated Sep. 21, 2011; for U.S. Appl. No. 12/541,244; 16 pages.

Office Action dated Dec. 30, 2012; for U.S. Appl. No. 12/541,244; 30 pages.

Response filed Mar. 15, 2012; to Office Action dated Dec. 30, 2012; for U.S. Appl. No. 12/541,244; 17 pages.

Notice of Allowance dated Jul. 19, 2012; for U.S. Appl. No. 12/266,724; 8 pages.

U.S. Appl. No. 12/335,213, filed Dec. 15, 2008.
U.S. Appl. No. 12/335,239, filed Dec. 15, 2008.
U.S. Appl. No. 12/266,724, filed Nov. 7, 2008.

* cited by examiner

US 8,463,808 B2

EXPANDING CONCEPT TYPES IN CONCEPTUAL GRAPHS

TECHNICAL FIELD

This invention relates generally to the field of information technology and management and more specifically to expanding concept types in conceptual graphs.

BACKGROUND

A corpus of data may hold a large amount of information, yet finding relevant information may be difficult. Keyword searching is the primary technique for finding information. In certain situations, however, known techniques for keyword searching cannot find conceptually similar terms for concepts that the keywords represent.

SUMMARY OF THE DISCLOSURE

In accordance with the present invention, disadvantages and problems associated with previous techniques for keyword searching may be reduced or eliminated.

According to one embodiment, searching documents includes generating a query conceptual graph for a search query. The query conceptual graph has graph terms, where a graph term represents a concept type. A set of conceptually similar terms is identified for each of one or more graph terms, and the set is mapped to the concept type represented by the graph term. Documents are searched in accordance with the set of conceptually similar terms.

According to one embodiment, selecting a document includes determining documents that satisfy a search query expressed as a query conceptual graph. The following is performed for each document: generating a document conceptual graph that has graph terms representing concept types; and identifying a set of conceptually similar terms for each of one or more graph terms, where the set is mapped to the concept type represented by the graph term. A document is selected if one or more terms of the sets of conceptually similar terms associated with the document match one or more terms associated with the query conceptual graph.

Certain embodiments of the invention may provide one or more technical advantages. A technical advantage of one embodiment may be that a query conceptual graph may be generated for a search query of a search. The query conceptual graph may include graph terms that represent concept types. A set of terms conceptually similar to the graph terms may be identified and used to perform the search.

Another technical advantage of one embodiment may be that a document conceptual graph may be generated for a document. The document conceptual graph may include graph terms that represent concept types. A set of terms conceptually similar to the graph terms may be identified and used to represent the document. Another technical advantage of one embodiment may be that conceptually similar terms of a document may be compared with conceptually similar terms of a search. The document may be selected as a result of the search if the terms match.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 6 of the drawings, like numerals being used for like and corresponding parts of the various drawings.

Figure 1:
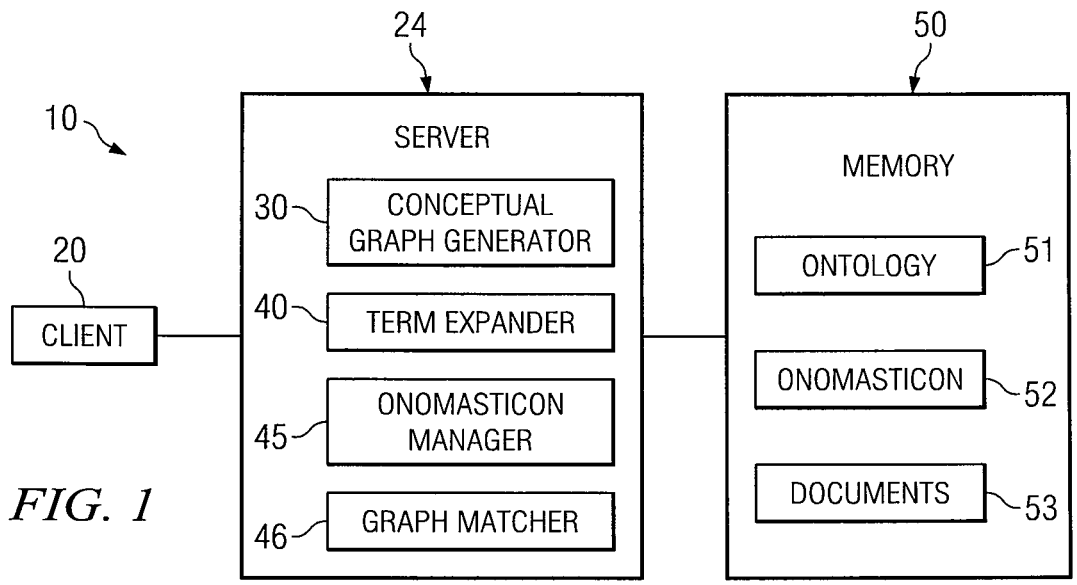
FIG. 1 illustrates one embodiment of a system configured to conceptually expand terms of conceptual graphs.

FIG. 1 illustrates one embodiment of a system 10 configured to expand concept types in conceptual graphs. In certain embodiments, system 10 generates a query conceptual graph that may represent a search query. The query conceptual graph may include graph terms that represent concept types. A set of terms conceptually similar to the graph terms may be identified and used to perform a search. In certain embodiments, system 10 generates a document conceptual graph that may represent a document. The document conceptual graph may include graph terms that represent concept types. A set of terms conceptually similar to the graph terms may be identified and used to represent the document. The conceptually similar terms of a document may be compared with conceptually similar terms of a search. The document may be selected as a result of the search if the terms match.

In the illustrated embodiment, system 10 includes a client 20, a server 24, and a memory 50. Server 24 includes a conceptual graph generator 30, a term expander 40, an onomasticon manager 45, and a graph matcher 46. Memory 50 includes an ontology 51, an onomasticon 52, and documents 53.

In particular embodiments, client 20 may send input to system 10 and/or receive output from system 10. In particular examples, a user may use client 20 to send input to system 10 and/or receive output from system 10. In particular embodiments, client 20 may provide output, for example, display, print, or vocalize output, reported by server 24, such as by term expander 30, conceptual graph generator 40, and/or graph matcher 46.

In particular embodiments, client 20 may send an input search query to system 10. An input search query may comprise any suitable message comprising one or more query terms that may be used to search for documents 53, such as a keyword query, or concept query based on keywords representing a concept. A term may comprise any suitable sequence of characters, for example, one or more letter, one or more numbers, and/or one or more other characters. An example of a term is a word.

Server 24 stores logic (for example, software and/or hardware) that may be used to perform the operations of system 10. In the illustrated example, server 24 includes term expander 40, conceptual graph generator 30, onomasticon manager 45, and graph matcher 46.

In particular embodiments, conceptual graph generator 30 generates a conceptual graph 60. A conceptual graph may be a graph that represents concept types expressed as terms (for example, specific instances of concept types) and the relationships among the concept types. An example of a conceptual graph is described with reference to FIG. 2A.

Figure 2A:
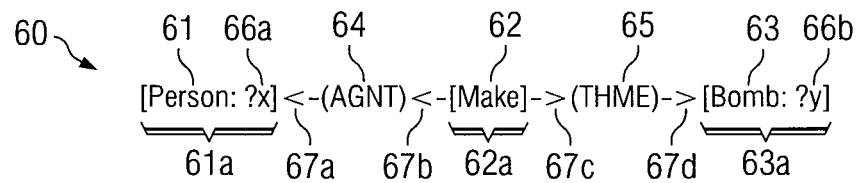
FIGS. 2A and 2B illustrate examples of a query conceptual graph and a document conceptual graph.

FIG. 2A illustrates an example of a conceptual graph 60. Conceptual graph 60 includes nodes, such as concept nodes 61a, 62a, and/or 63a and conceptual relation nodes 64 and/or 65, coupled by arcs 67 (67a, 67b, 67c, and/or 67d). The nodes include graph terms. A concept node 61a, 62a, and/or 63a represents a concept, and may include a concept type and a concept referent, which may be a specific instance of a concept type. The concept type may specify a concept, and the referent may designate a specific entity instance of the concept type.

In the illustrated example, concept node 61a includes concept type 61 "Person" and concept referent 66a "?x", which is an unknown concept referent. Concept node 62a includes concept type 62 "Make", but no concept referent. Concept node 63a includes concept type 63 "Bomb", and concept referent 66b "?y", which is an unknown concept referent. Concept types may be expressed as subjects, direct objects, verbs, or any suitable part of language. In the illustrated example, concept type 61 is a direct object represented by "Person", concept type 62 is a verb represented by "Make", and concept type 63 is a subject represented by "Bomb".

Conceptual relation nodes 64 and/or 65 represent relationships between concept nodes 61a, 62a, and/or 63a, and arcs 67 represent the direction of the relationships. In the illustrated example, conceptual relation node 64 "Agent" represents an agent relationship between concept nodes 61a and 62a. Arc 67a indicates that "Person:?x" is the agent of the action "Make". Conceptual relation node "THME" represents a theme relation between concept nodes 62a and 63a. Arc 67d indicates that "Bomb:?y" is the theme of the action "Make".

In particular embodiments, the concepts and the relationships among the concepts of conceptual graph 60 may be expressed in text. In certain embodiments, square brackets may be used to indicate concept nodes 61a, 62a, and/or 63a, and parentheses may be used to indicate conceptual relation nodes 64 and/or 65. Hyphens and/or arrows may be used to indicate arcs 67. In the illustrated example, the concepts and relationships may be expressed as:

[Person:?x].fwdarw.(Agent).fwdarw.[Make].rarw.(THME).rarw.[Bomb:?y]

Referring back to FIG. 1, in particular embodiments, conceptual graph generator 30 generates a document conceptual graph 300 for a document. An example of a document conceptual graph 300 is described in more detail with reference to FIG. 2B.

Figure 2B:
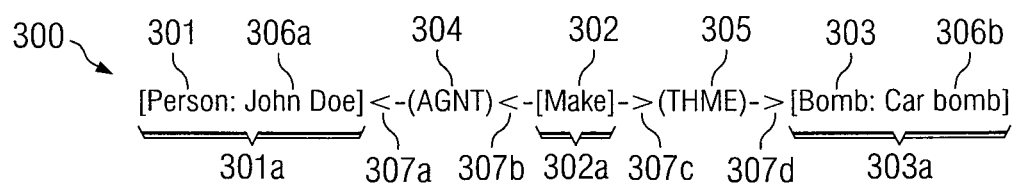

FIG. 2B illustrates an example of a document conceptual graph 300. In the illustrated example, document conceptual graph 300 includes nodes, such as concept nodes 301a, 302a, and/or 303a and conceptual relation nodes 304 and/or 305, coupled by arcs 307 (307a, 307b, 307c, and/or 307d). In the illustrated example, concept node 301a includes concept type 301 "Person" and concept referent 306a "John Doe". Concept node 302a includes concept type 302 "Make", but no concept referent. Concept node 303a includes concept type 303 "Bomb", and concept referent 306b "Car bomb".

In the illustrated example, conceptual relation node 304 "Agent" represents an agent relationship between concept nodes 301a and 302a. Arc 307a indicates that "Person: John Doe" is the agent of the action "Make". Conceptual relation node 305 "THME" represents a theme relation between concept nodes 302a and 303a. Arc 307d indicates that "Bomb: Car bomb" is the theme of the action "Make".

In the illustrated example, the concepts and relationships of document conceptual graph 300 may be expressed as:

[Person: John Doe]←(Agent)←[Make]→(Theme)→
[Bomb: Car bomb]

In the illustrated example, document conceptual graph 300 may represent some or all of a retrieved document that includes information about "Person (specified as John Doe) "Makes" a "Bomb" (specified as Car bomb)."

Referring back to FIG. 1, conceptual graph generator 30 may perform other suitable operations. In particular embodiments, conceptual graph generator may include an entity extractor that can extract concept types and/or referents to construct graphs.

In particular embodiments, term expander 40 expands terms representing concept types of conceptual graph 60 and/or 300. Term expander 40 may expand the terms by identifying, for each term, a set of terms conceptually similar to the term. Term expander 40 may use an ontology 51 to identify the conceptually similar terms. A search query may be formed using the conceptually similar terms.

Conceptually similar terms may be terms that are, for example, within the semantic context of each other. Examples of conceptually similar terms include synonyms, hypenyms, holonyms, hyponyms, merronyms, coordinate terms, verb participles, troponyms, and entailments. Conceptually similar terms may be in the native language of the search (for example, English) and/or a foreign language (for example, Arabic, French, or Japanese). In one embodiment, a foreign language term may be a foreign language translation of a native language term related to a conceptual graph.

A conceptually similar term (CST) of a term may be expressed as CST(term). For example, CST (Person) is Human.

In the illustrated example, examples of conceptually similar terms for query concept graph and/or 300 may be as follows:

CST(Person): Individual, Religious individual, Engineer, Warrior, etc.

CST(Make): Building, Build, Create from raw materials, etc.

CST(Bomb): Explosive device, Car bomb, Pipe bomb, etc.

The conceptually similar terms may include the following Arabic terms (English translation in parentheses):

CST(Person): شخص (Person), فرد (Individual), دينية فرد (Religious individual), المهندس (Engineer), المحارب (Warrior), etc.

CST(Make): تقدم (Make), بناء (Building), يبني (Build), خلق من المواد الخام (Create from raw materials), etc.

CST(Bomb): قنبلة (Bomb), عبوة ناسفة (Explosive device), سيارة مفخخة (Car bomb), انبوبية (Pipe bomb), etc.

In particular embodiments, onomasticon manager 45 manages onomasticon 52. Onomasticon manager 45 may manage information in onomasticons 52 by performing any suitable information management operation, such as storing, modifying, organizing, and/or deleting information. In particular embodiments, onomasticon manager 45 may perform the following mappings: a query conceptual graph to a search query, a set of conceptually similar terms to a concept type of a conceptual graph, a set of conceptually similar terms to a search query, a word sense of conceptually similar terms to a concept type, and/or a set of conceptually similar terms to a word sense. Onomasticon manager 45 may perform the operations at any suitable time, such as when information is generated or validated.

In particular embodiments, graph matcher 46 may compare query conceptual graphs 60 and document conceptual graphs 300 to see if graphs 60 and 300 match in order to select documents that match the search query. In particular embodiments, expanded document conceptual graphs 300 and expanded query conceptual graphs 60 may be compared.

Graphs may be regarded as matching if one, some, or all corresponding terms associated with the graphs match. Terms associated with a graph may include terms representing concept types of the graph and/or terms that are conceptually similar to the terms representing the concept types. Corresponding concept nodes may be nodes in the same location of a graph. For example, node 61a of graph 60 corresponds to node 301a of graph 300.

In the example, nodes 61a, 62a, 63a, 64, and/or 65 of conceptual graph 60 may match nodes 301a, 302a, 303a, 304, and/or 305 of conceptual graph 300 if the concept types and/or relations of nodes 61a, 62a, 63a, 64, and/or 65 match that of nodes 301a, 302a, 303a, 304, and/or 305, respectively. In the example, conceptual graphs 60 and 300 may be regarded as matching.

In particular embodiments, graph matcher 46 may validate a match using onomasticons 52. In certain examples, graph matcher 46 may determine whether conceptually similar terms of graphs 60 and 300 map to the same concept type in one or more onomasticons 52. If they do, the match may be regarded as valid. In certain examples, the conceptually similar terms of graphs 60 and 300 may be in the same or different onomasticons 52.

In particular embodiments, if a document conceptual graph 300 representing a document 53 matches query conceptual graphs 60, graph matcher 46 may select document 53 to report to client 20.

Memory 50 includes ontology 51, onomasticon 52, and documents 53. Ontology 51 stores terms, attributes of terms, word senses (or definitions) of terms, and relationships among the terms. Ontology 51 may be used (for example, by term expander 40) to determine the appropriate terms, attributes, and relationships. For example, ontology 51 may describe the semantically related terms of a term and the relationships that the term may have with other terms. Relationships may include such as synonyms, hypenyms, holonyms, hyponyms, merronyms, coordinate terms, verb participles, troponyms, and entailments. For example, ontology 51 may store the conceptually similar terms for "Person", "Make", and "Bomb" as described above.

Figure 3:
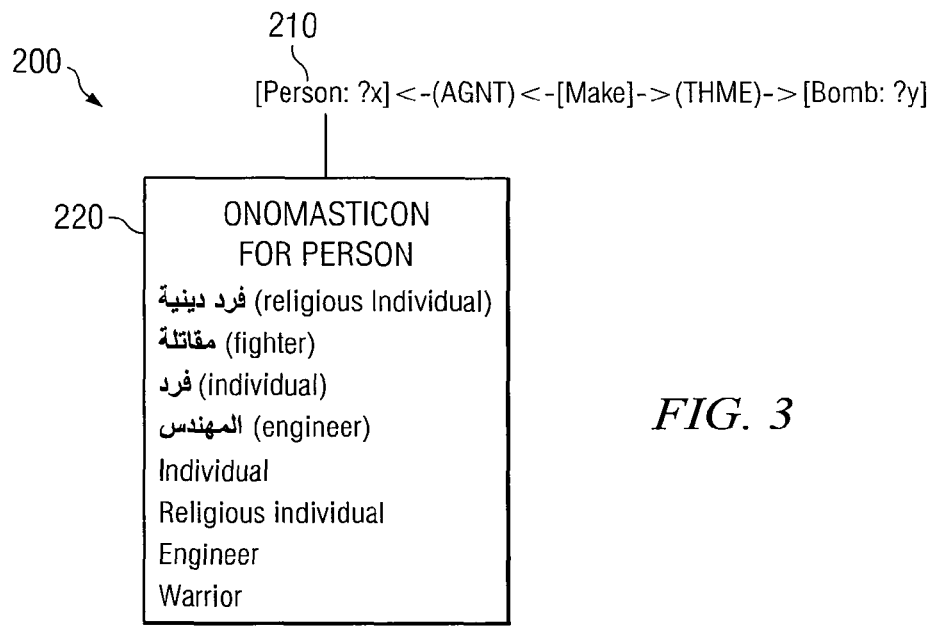
FIG. 3 illustrates an example of an onomasticon that includes terms associated with a query conceptual graph 1.
Figure 4:
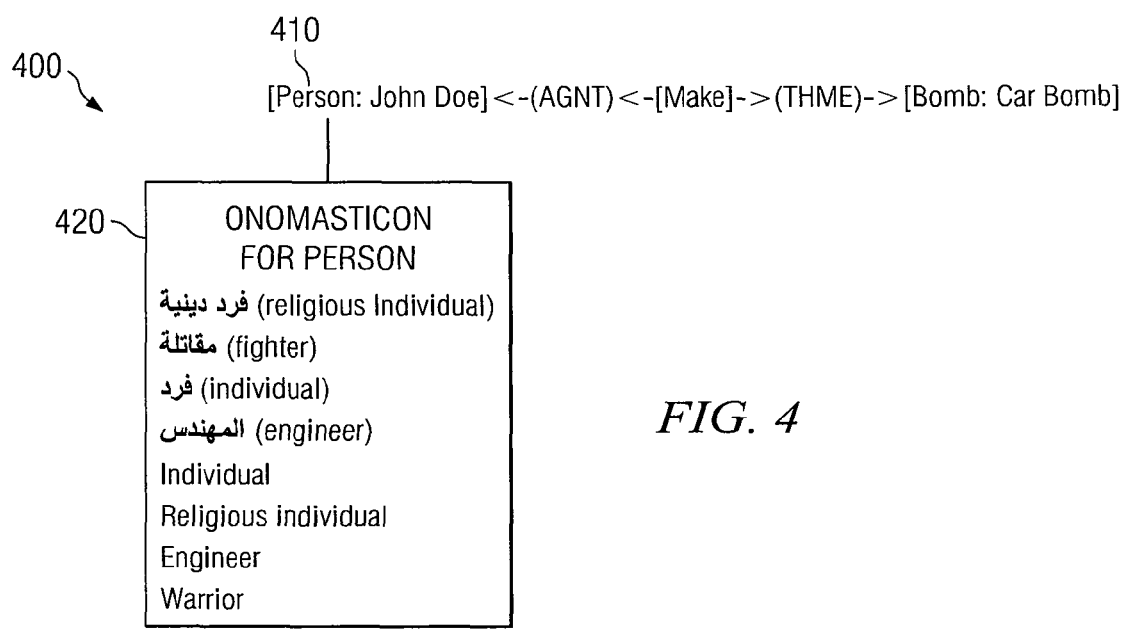
FIG. 4 illustrates an example of an onomasticon that includes terms associated with a document conceptual graph.

Onomasticon 52 records information resulting from the operations of system 10 in order to build a knowledge base of conceptually similar terms to represent concept types found in conceptual graphs. Onomasticon 52 may store mappings of the conceptually similar terms to the concept types. In particular embodiments, information in onomasticon 52 may be used for future searches. For example, term expander 40 may retrieve conceptually similar terms mapped to a term from onomasticon 52. FIGS. 3 and 4 illustrate examples of onomasticons 52.

FIG. 3 illustrates an example of an onomasticon 220 that may be used for a query conceptual graph 60. Onomasticon 220 stores conceptually similar English and foreign language terms, such as Arabic terms, for the concept type [Person] 210. These terms may include Individual, Religious individual, Engineer, Warrior, فرد (Individual), دينية فرد (Religious individual), المهندس (Engineer), and مقاتلة (Fighter).

FIG. 4 illustrates an example of an onomasticon 420 that may be used for a document conceptual graph 300. Onomasticon 420 stores conceptually similar English and foreign language terms, such as Arabic terms, for the concept type [Person] 410. These terms may include Individual, Religious individual, Engineer, Warrior, فرد (Individual), دينية فرد (Religious individual), المهندس (Engineer), and مقاتلة (Fighter).

Referring back to FIG. 1, a document 53 may refer to a collection of terms (such as words), and may be stored electronically. Documents 53 may include documents in a native language and/or a foreign language.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. For example, the operations of conceptual graph generator 30 and term expander 40 may be performed by one component, or the operations of onomasticon manager 45 may be performed by more than one component. Additionally, operations of system 10 may be performed using any suitable logic comprising software, hardware, and/or other logic. As used in this document, "each" refers to each member of a set or each member of a subset of a set.

Figure 5:
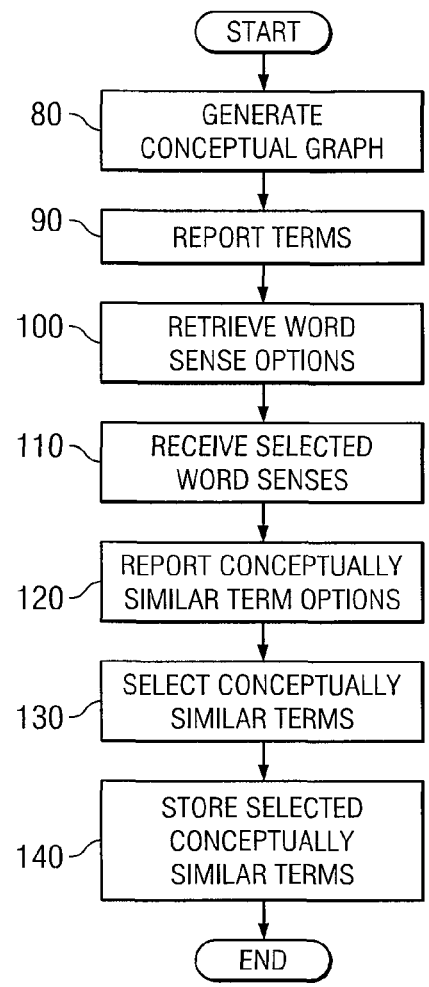
FIG. 5 illustrates an example of a method for expanding terms of a query conceptual graph.

FIG. 5 illustrates an example of a method for generating and expanding a query conceptual graph 60, such as query conceptual graph 200. System 10 generates query conceptual graph 200, at step 80.

In the example, steps 90 through 110 describe determining the semantic sense of terms representing concept types of conceptual graph 200. The semantic sense may be determined from the meaning of the terms. Conceptual graph generator 30 reports terms representing concept types of conceptual graph 200 to term expander 40 at step 90. Term expander 40 retrieves word sense options for one or more terms from ontology 51 at step 100. A word sense may indicate the use of a term in a particular semantic context. In the example, for the term "bomb", the word sense options may include "to bomb a test" and "to detonate a bomb."

A word sense may be selected from the word sense options automatically or by a user. A selected word sense is received by term expander 40 at step 110. Onomasticon manager 45 may map the selected word sense to the concept type and store the mapping in onomasticon 52.

Term expander 40 reports conceptually similar term options based on the selected word sense at step 120. In some embodiments, the conceptually similar term options may be retrieved from onomasticon 52. In the example, the similar terms "bomb" may include "pipe bomb," "shoe bomb," and "car bomb." One or more conceptually similar terms may be selected (by a user or automatically) from the conceptually similar term options at step 130.

Onomasticon manager 45 stores the selected conceptually similar terms at step 140. For example, onomasticon manager 45 may map the selected conceptually similar terms to the concept type of conceptual graph 200 and store the mappings in onomasticon 52, such as onomasticon 220. To obtain similar foreign terms, certain native terms may be translated into foreign terms at any suitable step. The foreign terms may be used to select conceptually similar foreign terms (by a user or automatically).

Modifications, additions, or omissions may be made to the method without departing from the scope of the invention. The method may include more, fewer, or other steps. Additionally, steps may be performed in any suitable order.

Figure 6:
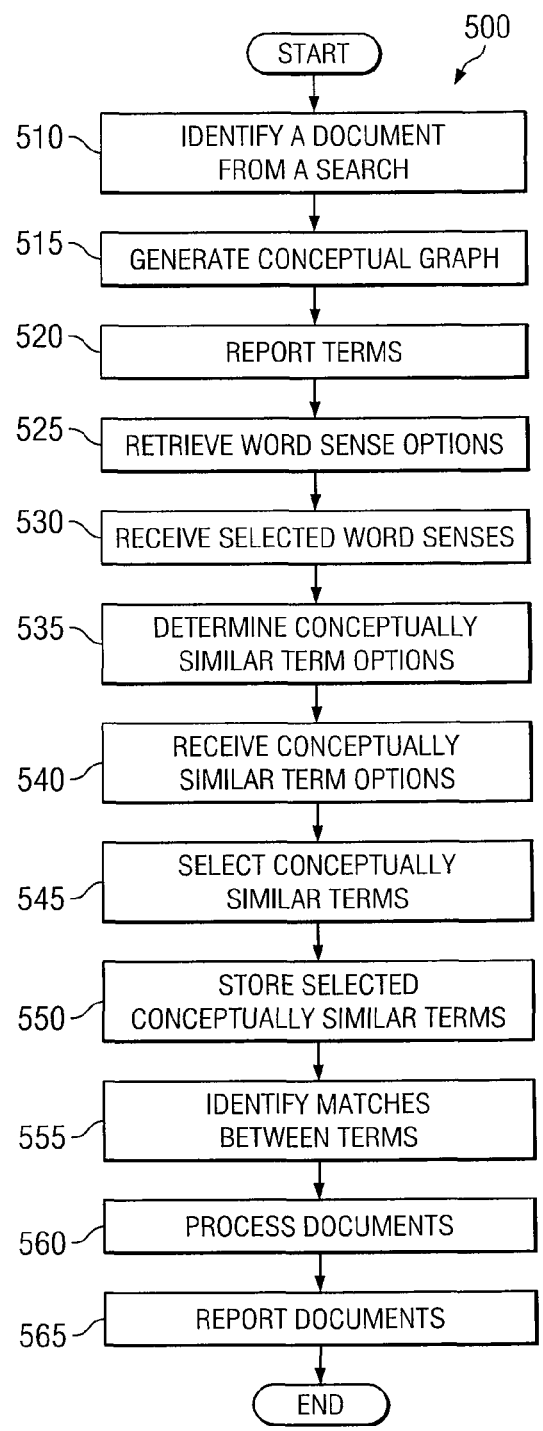
FIG. 6 illustrates an example of a method for generating and expanding a document conceptual graph.

FIG. 6 illustrates an example of a method for generating and expanding a document conceptual graph 400. Documents 53 resulting from a search represented by query conceptual graphs 60, such as query conceptual graphs 200, are identified at step 510. Document conceptual graphs 400 are generated for documents 53 at step 515. For example, conceptual graph generator 30 may generate graph 400. Onomasticon manager 45 may map document conceptual graph 400 to the document identifier of the document that graph 400 represents and store the mapping in onomasticon 52.

In the example, steps 520 through 530 describe determining the semantic sense of concept types of document conceptual graph 400. Conceptual graph generator 30 reports terms representing concept types of document conceptual graph 400 to term expander 40 at step 520. Term expander 40 receives word sense options for the terms from ontology 51 at step 525.

A word sense may be selected from the word sense options automatically or by a user. A selected word sense is received by term expander 40 at step 530. Onomasticon manager 45 may map the selected word sense to the concept type of document conceptual graph 400 and store the mapping in onomasticon 52.

Conceptually similar term options associated with the selected word sense are determined at step 535. In certain embodiments, ontology 51 reports conceptually similar term options. In certain embodiments, term expander 40 may identify conceptually similar term options from the word sense. In some embodiments, the conceptually similar term options may be retrieved from onomasticon 52. The term options are received by term expander 40 at step 540.

Conceptually similar terms may be selected (automatically or by a user) from the conceptually similar term options at step 545. Onomasticon manager 45 may map the selected similar terms to the concept type and store the mappings in onomasticon 420 at step 550. To obtain similar foreign terms, certain native terms may be translated into foreign terms.

Matches between terms of query conceptual graph 200 and terms of document conceptual graph 400 are identified at step 555. The matches may be stored in onomasticons 210 and 410. Graph matcher 46 may identify and validate the matches. The matches may be sorted according to semantic proximity.

Documents 53 may be processed at step 560. For example, documents 53 may be translated from a foreign language to the native language. Accordingly, documents 53 stored in memory 50 need not be translated unless they have been identified as important for a search. Documents 53 are reported to client 20 at step 565. Documents 53 may be displayed in a user interface.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a query conceptual graph may be generated for a search query of a search. The query conceptual graph may include graph terms that represent concept types. A set of terms conceptually similar to the graph terms may be identified and used to perform the search.

Another technical advantage of one embodiment may be that a document conceptual graph may be generated for a document. The document conceptual graph may include graph terms that represent concept types. A set of terms conceptually similar to the graph terms may be identified and used to represent the document. Another technical advantage of one embodiment may be that conceptually similar terms of a document may be compared with conceptually similar terms of a search. The document may be selected as a result of the search if the terms match.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   generating a query conceptual graph for a search query, the query conceptual graph comprising:
   a plurality of graph terms, a graph term representing a concept type;
   a plurality of conceptual relation nodes that each comprise text describing a relationship between two or more of the plurality of graph terms; and
   a plurality of arcs that each indicate a direction of the relationship described by the text of a corresponding conceptual relation node of the plurality of conceptual relation nodes;
   identifying at least one set of conceptually similar terms for at least one graph term of the query conceptual graph, the at least one set of conceptually similar terms mapped to the corresponding concept type represented by the respective at least one graph term;
   searching a plurality of documents in accordance with a search query based at least in part on the query conceptual graph and on the set of conceptually similar terms;
   selecting a document from the plurality of documents as a potential match to the search query if, when the query conceptual graph is compared to a document conceptual graph for the document, there is at least one corresponding term associated with the query conceptual graph that matches at least one corresponding term associated with the document conceptual graph, wherein the corresponding term associated with each respective conceptual graph comprises at least one or more of: terms representing a concept type, and terms that are conceptually similar to the terms representing concept types;
   accessing one or more onomasticons, each onomasticon comprising a list of one or more mappings, each mapping comprising a mapping of a predetermined concept type to a corresponding set of conceptually similar terms; and validating that the potential match is a valid match if a set of conceptually similar terms of the query conceptual graph, and a set of conceptually similar terms of the document conceptual graph that is associated with the potentially matching document, map to the same concept type in one or more onomasticons.

2. The method of claim 1, the generating the query conceptual graph for the search query further comprising: generating the query conceptual graph in accordance with one or more query terms of the search query.

3. The method of claim 1, the identifying the at least one set of conceptually similar terms for the at least one graph term further comprising:
determining a semantic sense for a search query concept of the search query; and
identifying the at least one set of conceptually similar terms in accordance with the semantic sense.

4. The method of claim 1, the identifying the at least one set of conceptually similar terms for the at least one graph term further comprising:
determining a plurality of conceptually similar term options in accordance with a semantic sense for a search query concept of the search query; and
identifying the at least one set of conceptually similar terms from the plurality of conceptually similar term options.

5. The method of claim 1: the at least one set of conceptually similar terms comprising at least one foreign language term comprising a foreign language translation of a native language term conceptually similar to the search query.

6. A system comprising:
a computer system comprising a processor and a memory, the memory configured to store a query conceptual graph for a search query, the query conceptual graph comprising:
a plurality of graph terms, a graph term representing a concept type;
a plurality of conceptual relation nodes that each comprise text describing a relationship between two or more of the plurality of graph terms; and
a plurality of arcs that each indicate a direction of the relationship described by the text of a corresponding conceptual relation node of the plurality of conceptual relation nodes; and
logic stored in one or more tangible media and when executed by the computer system, the logic is configured to:
generate the query conceptual graph;
identify at least one set of conceptually similar terms for at least one graph term of the query conceptual graph, the at least one set of conceptually similar terms mapped to the corresponding concept type represented by the respective at least one graph term; and
search a plurality of documents in accordance with a search query based at least in part on the query conceptual graph and on the set of conceptually similar terms;
select a document from the plurality of documents as a potential match to the search query if, when the query conceptual graph is compared to a document conceptual graph for the document, there is at least one corresponding term associated with the query conceptual graph that matches at least one corresponding term associated with the document conceptual graph, wherein the corresponding term associated with each respective conceptual graph comprises at least one or more of: terms representing a concept type, and terms that are conceptually similar to the terms representing concept types;

access one or more onomasticons, each onomasticon comprising a list of one or more mappings, each mapping comprising a mapping of a predetermined concept type to a corresponding set of conceptually similar terms; and validate that the potential match is a valid match if a set of conceptually similar terms of the query conceptual graph, and a set of conceptually similar terms of the document conceptual graph that is associated with the potentially marching document, maps to the same concept type in one or more onomasticons.

7. The system of claim 6, the logic configured to generate the query conceptual graph for the search query by: generating the query conceptual graph in accordance with one or more query terms of the search query.

8. The system of claim 6, the logic configured to identify the at least one set of conceptually similar terms for the at least one graph term by:
determining a semantic sense for a search query concept of the search query; and
identifying the at least one set of conceptually similar terms in accordance with the semantic sense.

9. The system of claim 6, the logic configured to identify the at least one set of conceptually similar terms for the at least one graph term by:
determining a plurality of conceptually similar term options in accordance with a semantic sense for a search query concept of the search query; and
identifying the at least one set of conceptually similar terms from the plurality of conceptually similar term options.

10. The system of claim 6: the at least one set of conceptually similar terms comprising at least one foreign language term comprising a foreign language translation of a native language term conceptually similar to the search query.

11. A method comprising:
determining a plurality of documents that satisfy a search query expressed as a query conceptual graph;
performing the following for each document of the plurality of documents to identify one or more sets of conceptually similar terms for the each document:
generating a document conceptual graph for each document, the document conceptual graph comprising:
a plurality of graph terms, a graph term representing a concept type;
a plurality of conceptual relation nodes that each comprise text describing a relationship between two or more of the plurality of graph terms; and
a plurality of arcs that each indicate a direction of the relationship described by the text of a corresponding conceptual relation node of the plurality of conceptual relation nodes; and
identifying one or more sets of conceptually similar terms for at least one graph term of the document conceptual graph, the one or more sets of conceptually similar terms mapped to the concept type represented by the at least one graph term;
selecting at least one document from the plurality of documents as a potential match to the search query if, when the query conceptual graph is compared to a document conceptual graph for the document, there is at least one corresponding term associated with the query conceptual graph that matches at least one corresponding term associated with the document conceptual graph, wherein the corresponding term associated with each respective conceptual graph comprises at least one or more of: terms representing a concept type, and terms that are conceptually similar to the terms representing concept types;

accessing one or more onomasticons, each onomasticon comprising a list of one or more mappings, each mapping comprising a mapping of a predetermined concept type to a corresponding set of conceptually similar terms; and validating that the potential match is a valid match if a set of conceptually similar terms of the query conceptual graph, and a set of conceptually similar terms of the document conceptual graph that is associated with the potentially matching document, maps to the same concept type in one or more onomasticons.

12. The method of claim 11, further comprising: validating a match between a subset of the one or more sets of conceptually similar terms of the document and the one or more terms associated with the query conceptual graph.

13. The method of claim 11, further comprising: initiating translation of at least one document from a foreign language to a native language of the search query.

14. The method of claim 11, the identifying the one or more sets of conceptually similar terms for the each graph term further comprising:
determining a semantic sense for a search query concept of the search query; and
identifying the one or more sets of conceptually similar terms in accordance with the semantic sense.

15. The method of claim 11, the identifying of the one or more sets of conceptually similar terms for the at least one graph term further comprising: identifying the one or more sets of conceptually similar terms using the one or more onomasticons.

16. A system comprising:
a computer system comprising a processor and memory, the memory configured to store a search query expressed as a query conceptual graph; and
logic stored in one or more tangible media and when executed by the computer system, the logic is configured to:
determine a plurality of documents that satisfy the search query;
perform the following for each document of the plurality of documents to identify one or more sets of conceptually similar terms for each document:
generate a document conceptual graph for each document, the document conceptual graph comprising:
a plurality of graph terms, a graph term representing a concept type;
a plurality of conceptual relation nodes that each comprise text describing a relationship between two or more of the plurality of graph terms; and
a plurality of arcs that each indicate a direction of the relationship described by the text of a corresponding conceptual relation node of the plurality of conceptual relation nodes;
identify one or more sets of conceptually similar terms for each graph term of the document conceptual graph, the one or more sets of conceptually similar terms mapped to the concept type represented by each graph term;
select a document as a potential match if one or more terms of the one or more sets of conceptually similar terms for the document match one or more terms associated with the query conceptual graph;
access one or more onomasticons, each onomasticon comprising a list of one or more mappings, each mapping comprising a mapping of a predetermined concept type to a corresponding set of conceptually similar terms; and
validate that the potential match is a valid match if one or more of the sets of conceptually similar terms a set of conceptually similar terms of the query conceptual graph, and a set of conceptually similar terms of the document conceptual graph that is associated with the potentially matching document, maps to the same concept type in one or more onomasticons.

17. The system of claim 16, the logic further configured to: select the validate the potential match between a subset of the one or more sets of conceptually similar terms of the document and the one or more terms associated with the query conceptual graph.

18. The system of claim 16, the logic further configured to: initiate translation of at least one document from a foreign language to a native language of the search query.

19. The system of claim 16, the logic configured to identify the one or more sets of conceptually similar terms for the each graph term by:
determining a semantic sense for a search query concept of the search query; and
identifying the one or more sets of conceptually similar terms in accordance with the semantic sense.

20. The system of claim 16, the logic further configured to: identify the one or more sets of conceptually similar terms for the each graph term by identifying the one or more sets of conceptually similar terms using the one or more onomasticons.

* * * * *